United States Patent [19]

Moon et al.

[11] Patent Number: 4,493,725

[45] Date of Patent: Jan. 15, 1985

[54] FERTILIZER PRODUCT WITH SUSTAINED ACTION AND PROCESS THEREFOR

[75] Inventors: Sang H. Moon; Jae M. Park; Sung S. Suh, all of Seoul, Rep. of Korea

[73] Assignee: Korea Advanced Institute of Science and Technology, Seoul, Rep. of Korea

[21] Appl. No.: 495,531

[22] Filed: May 17, 1983

[51] Int. Cl.³ ............................ C05D 9/00; C05D 9/02
[52] U.S. Cl. ........................................ 71/62; 71/64.07; 71/64.11; 427/213.32
[58] Field of Search ................. 71/64.07, 64.12, 64.11, 71/62, 52; 427/213.3, 213.31, 213.32, 213.35

[56] References Cited

U.S. PATENT DOCUMENTS

| | | | |
|---|---|---|---|
| 2,731,340 | 1/1956 | Seifert | 71/52 |
| 3,137,565 | 6/1964 | Hayes | 71/62 |
| 4,321,078 | 3/1982 | Michaud | 71/44 |

FOREIGN PATENT DOCUMENTS

| | | | |
|---|---|---|---|
| 130353 | 10/1979 | Japan | 71/62 |

*Primary Examiner*—Howard S. Williams
*Assistant Examiner*—T. L. Williams
*Attorney, Agent, or Firm*—Holman & Stern

[57] ABSTRACT

A fertilizer product in granular form with sustained action is provided by spraying a silicate-based solution on the surface of the fertilizer granules in a conventional coating machine which is maintained at temperatures ranging from 20° to 100° C. The coating solution comprises 1 to 50% by weight of a silicate and/or silicic acid ester based on the weight of the fertilizer material to be treated, 0.001 to 1.0 part by weight of a metal and/or non-aqueous metallic compound (first additives), 0.001 to 1.0 part by weight of an aqueous metallic compound (second additives), 0.001 to 1.0 part by weight of an inorganic mineral (third additives), and optionally high molecular weight organic compound, wherein all parts described above are based on the weight of the silicate and/or silicic acid ester used. The coated fertilizer granules are subject to heat-treatment for 10 seconds to 10 days under conditions that the relative humidity and the temperature be maintained at 5 to 95% and 10° to 250° C., respectively.

14 Claims, No Drawings

FERTILIZER PRODUCT WITH SUSTAINED ACTION AND PROCESS THEREFOR

FIELD OF THE INVENTION

This invention relates to an improvement in a fertilizer product with substained action and a process for preparing the same. More particularly, this invention is concerned with a process for preparing said fertilizer product by coating a fertilizer material with a coating material containing a silicate as a main ingredient, so that the fertilizer components can slowly be released into the soil.

BACKGROUND OF THE INVENTION

Conventional synthetic fertilizer materials such as urea, phosphatic fertilizer, potassium manure, ammonium sulfate and so forth, which are the most commonly used fertilizers, are readily soluble in water. Therefore, they are subject to leaching and their use results in a rapid release of their components. This loss of the fertilizer components will affect the sustained growth of crops and thus results in a decrease in harvest of the crops.

Many proposals have been made for obtaining a fertilizer product with sustained action, the releasing rate of the active components of which product can adequately be controlled.

In general, fertilizers with sustained action have been manufactured by chemical or physical methods. In chemical methods, a fertilizer material is reacted with one or more different compounds to produce another chemical substance, the active portions of which can steadly be degraded and released when the substance is applied to the ground.

The fertilizer products of this type involve urea-formaldehyde condensates disclosed in U.S. Pat. Nos. 2,830,036 and 3,227,543; crotylidenediurea and urea-acetaldehyde condensates in U.S. Pat. No. 3,190,741 and U.K. Pat. No. 1,041,537; isobutylidenediurea (IBDU) in U.S. Pat. No. 3,054,699 and Japanese Patent Publication No. (Sho) 38-7942; and magnesium ammonium phosphate in U.S. Pat. Nos. 2,827,368 and 3,181,943. However, these products require enormous production costs of about 3 to 4 times as compared with those of conventional products, because an additional procedure for reacting a fertilizer material with one or more different chemicals must be accompanied. Therefore, these chemical methods have not been commercially available.

Physical methods are divided into a combination method in which a conventional fertilizer material is entrained in and adsorbed on a proper material, and a coating method in which a thin-layer coating is formed around a granular fertilizer material.

In the combination method, wax, asphalt and petroleum resins (U.S. Pat. No. 3,219,433), high molecular weight compounds such as polyurethane (U.S. Pat. No. 3,232,739), white clay (U.S. Pat. No. 2,991,170) and the like are used as an entraining or adsorbing matrix for fertilizer materials. Although the fertilizer products in accordance with this combination method can be manufactured inexpensively, the products have drawbacks which the releasing rate of the fertilizer components is unequal and the content of the active ingredients per unit weight is lower.

Since, in accordance with the coating method, it is possible to manufacture a long-acting fertilizer product, which can contain higher fertilizer components, by selecting a proper coating material and to easily control the releasing rate of the components, the method has been considered most appropriate for practical use. Wax, high molecular weight compounds and sulfur have been proposed as coating materials useful in the coating method. Among the materials, was (U.S. Pat. Nos. 3,096,171 and 3,256,786) possesses physiochemically hydrophobic characteristics but there are some problems that the coating requires a plenty of wax which is apt to be adhered to the inner surfaces of the coating machines and the fertilizer material involved is readily diffused into wax.

A urea-aldehyde condensate (U.S. Pat. Nos. 3,214,259 and 3,248,255) among the high molecular weight compounds has been considered as an attractive coating material because it contains a high content of nitrogen. However, it has defects that the coating resulted from using the condensate as a coating material has a bad quality and high water-permeability. As another coating material, a copolymer between dicyclopentadiene and glycerol ester, which is available under the trademark OSMOCOTE from Archer Daniels Midland Company, U.S.A. (U.S. Pat. No. 3,233,518) is recommendable. By using a solution of the copolymer in a solvent as a coating material, it may be possible to form good multi-layer coatings around fertilizer particles. In practice, however, this material is expensively available and the solvent recovery remains unsolved.

A method for encapsulating a fertilizer material with sulfur is disclosed in U.S. Pat. No. 3,295,950 assigned to T.V.A., U.S.A. In this method, molten sulfur is sprayed on the surfaces of the fertilizer particles in a rotating drum. This method can provide coated fertilizers at lower costs because sulfur is cheaply available. However, the quality of the sulfur coating is poor and the method requires further various additives such as sealing agents for preventing the sulfur coating from being cracked and regulating agents for preventing the product from being coagulated and floating on the water surface. In addition, this sulfur-coated fertilizer product is very poor in views of its property and its storage quality. When the product is applied to the surface of ground, sulfur may easily be degradable by the action of the microorganisms living upon the soil and thus it is difficult to control the releasing rate of the fertilizer components into the soil.

From the foregoing, it will be noted that conventional long-acting fertilizer products have been encountered with many problems such as high production costs, imperfect coating ability and quality, recovery of the solvent used, prevention of the the biodegradation, decrease of the floatability on the water surface, storage quality, use of an excess amount of additives, accumulation of the coating materials on and in the soil, the result, etc.

SUMMARY OF THE INVENTION

The primary object of the invention is to provide a fertilizer product with sustained action, which contains a high content of nitrogen and eliminates the conventional drawbacks.

Another object of the invention is to provide a process for preparing such a fertilizer product.

These and other objects of the invention can be attained by the process of the invention which comprises coating a granular fertilizer material with a coating material comprising 1 to 50% by weight of a silicate and/or a silicic acid ester based on the weight of the fertilizer material, 0.001 to 1.0 part by weight of a metal and/or non-aqueous metallic compound, 0.001 to 1.0 part by weight of an aqueous metallic compound, 0.001 to 1.0 part by weight of an inorganic mineral, and a high molecular weight organic compound. All parts are based on the weight of the silicate and/or silicic acid ester used.

DETAILED DESCRIPTION OF THE INVENTION

In brief, the fertilizer product in accordance with the invention can be manufactured by spraying a coating solution on the surface of the fertilizer particles in a conventional coating machine. Therefore, in order to practice the invention, a coating solution should have been prepared in advance. The coating solution is prepared by adding in an adequate amount of metal or non-aqueous metallic salts (first additives), aqueous metallic salts (second additives), inorganic minerals (third additives), and optionally high molecular weight organic compounds to an aqueous silicate-based solution and mixing the resulting mixture.

Herein, the term "silicate-based solution" includes an aqueous solution of lithium silicate, sodium silicate, potassium silicate, ethyl silicate and the like.

The term "first additives" includes oxides, hydroxides, fluorides, carbonates and phosphates of magnesium, calcium, iron, zinc, aluminium or the like, and powdered zinc, aluminum, calcium sulfate, ferrosilicon, calcium silicide, calcium sulfite, calcium silicofluoride, titania, silica and the like.

The term "second additives" includes phosphates, carbonates, fluorides, sulfates, hydroxides, borates and silicofluorides of ammonium, sodium, potassium and the like, and chlorides, sulfides, sulfates and silicofluorides of magnesium, zinc, aluminium, iron and the like.

The term, "third additives" includes kaoline, nitre, boiling stone, talc, diatomaceous earth, alumina, feldspar, alunite, bentonite, pearlite and the like.

Each of the compounds falling within the category of the above three additives may be used either alone or in combination with one or more of the other of the compounds.

Finally, the term, "high molecular weight organic compounds" includes gelatin, carageenan, cellulose derivatives and the like. The addition of the organic compounds is not necessarily required in the invention, but it may result in an improvement of the crack-resistance of the coating formed.

The silicate-based solution is prepared by dissolving a silicate and/or silicic acid ester in water so that the solid content of the solution can be 10 to 50% by weight based on the total weight of the fertilizer material to be treated. To this solution, one or more first additives are added in the amount of 0.001 to 1.0 part by weight based on the weight of the silicate-based solution while severely stirring. And, with this mixture, one or more third additives are mixed in the amount of 0.001 to 1.0 part by weight based on the silicate-based solution while stirring. Finally, to the resulting solution under stirring, one or more second additives are slowly added in the amount of 0.001 to 1.0 part by weight based on the silicate-based solution. It is preferable to adjust the pH of the final solution (hereinafter, referred to as the "coating material") to the range between from 9.0 to 14.0.

Preferably, the first and the third additives are added in the form of powder having a particle size less than 100 mesh (U.S. Standard), while the second additives are added in the form of an aqueous solution. If desired, a high molecular weight organic compound may further be added to the coating material.

The coating material thus obtained is sprayed on the surfaces of the fertilizer particles of 0.03 to 2 mm in diameter in either a rotary coating machine in which the particles are rolling or a coating machine with fluidizing columns in which the particles fluidize, in order to coat the particles. When the coating machine with fluidizing columns is employed in performing the invention, the feed rate of the coating material to 500 grs. of the fertilizer material to be coated ranges preferably between from 2.00 to 20 ml/min. If an air-mixing spray nozzle is used for the spraying procedure, the air pressure should be adjusted to the range between from 0.2 to 5.0 $kg/cm^2$. The temperature in the coating chamber of each of the coating machines should be maintained at 20° to 100° C.

These process parameters are not controlled as individual variants but have a close relation to each other. For instance, when the coating temperature is higher, the concentration of the coating material or its spraying rate must be lowered. In addition, depending upon the particle size of the fertilizer material involved, the coating temperature may be lowered or the rotating or fluidizing speed of the coating machine be increased. It is advantageous that, throughout the coating procedure, the coating material be consistently stirred but the temperature of the entire coating procedure be variable. Preferably, the initial temperature of the coating procedure must be controlled so that it can gradually be decreased following the progresses of the coating procedure.

After completing the coating procedure, the coated fertilizer particles are subject to heat-treatment for a period of time from 10 seconds to 10 days under conditions that the relative humidity and the temperature are maintained at 5 to 95% and 10° to 250° C., respectively. The lower the temperature of heat-treatment, the longer the period of time for heat-treatment. It is preferably that both of the humidity and the temperature of heat-treatment are not maintained at fixed conditions, so that between the initial and the end conditions of the treatment, there would be a difference.

The injection of carbon dioxide ($CO_2$) during the heat-treatment procedure or the washing of the surfaces of the coated fertilizer particles with an acidic solution may be introduced to insolubilize the silicate coatings.

Therefore, it will be noted that since the process in accordance with the invention employs an aqueous silicate solution as a coating material, it would not suffer from the problems of the solvent recovery. The invention can simply start only from preparing the coating material. Since, in accordance with the invention, uniform coatings can be formed around the fertilizer particles without causing coagulation between the particles or cracks on the surfaces of the coatings, any of the fertilizer components can not be leaked through the coating shell, upon applying the fertilizer product to the soil or plants. Furthermore, the fertilizer product in accordance with the invention has a good storage quality and are not settled down in water even without containing any additional fillers.

Furthermore, the silicates and/or various additives themselves used in the invention may act as active fertilizer components which plants want and, therefore, the accumulation of the components on and/or in the soil due to a long application may preferably improve the soil properties.

The invention is further illustrated by way of the following examples in which all parts and percentages are by weight unless otherwise indicated. These non-limiting examples are illustrative of certain embodiments designed to teach those skilled in the art how to practice the invention and to represent the best mode contemplated for carrying out the invention.

REFERENCE 1

In a coating machine having fluidizing columns (UNI-GLATT from Ogawahara Seisakusho, Japan), 500 grs. of urea particles having an average particle size of 3 to 5 mm were placed. The urea particles were preheated to 70° C. for 30 minutes and fludized while maintaining the air-flow rate at $5 \times 10^{-2}$ m$^3$/sec. for sufficiently fluidizing the particles. An aqueous solution of 38% by weight of sodium silicate (silicon oxide/sodium oxide = 3.4) in water was prepared (Solution A).

After 118.4 grs. of the solution were diluted with water until the content of sodium silicate reached at 24% by weight, the diluted solution was sprayed onto the fluidizing columns at a flow rate of 7 ml/min. under a nozzle pressure of 1.0 kg/cm$^2$. The temperature of the fluidizing columns was consistently maintained at 70° C. through the coating procedure of the fertilizer particles. Upon completing the coating procedure, the fluidized particles were cooled to an ambient temperature and dried for 10 minutes.

During the coating procedure, there was found no coagulation between the particles. By the coating procedure, smooth and transparent coatings were obtained. No cracks on the surfaces of the coated particles were also found under a microscopical examination at 30 magnification. The coated particles were maintained at 40° C. for 30 minutes. Thereafter, when the temperature reached to 90° C. by gradually increasing it at the rate of 0.5° C. per minute, the particles were treated by heat for 2 hours while maintaining the temperature at 90° to 100° C. Upon completing the heat-treatment, the coated fertilizer particles were placed in a water-bath. As a result, it was found that after 24 hours, 100 percent of the nitrogen contained in the fertilizer particles had been released.

As stated above, only with sodium silicate as a coating agent, individual fertilizer particles could sufficiently be coated, without causing any coagulation. However, the resulting coating had a fault that it would strongly absorbs water and tended to be readily dissolved in water.

Consequently, by the succeeding examples the methods for reducing the level of release of the active ingredients from the fertilizer product concerned will be embodied.

EXAMPLE 1

A solution of zinc carbonate powder in water (65/35) was obtained by mixing the mixture in a ball mill for 2 weeks (Solution B). Another two solutions of kaolin (5 grs.) in water (23.4 grs.) (Solution C) and potassium dihydrogen phosphate (KH$_2$PO$_4$) (6 grs.) and lithium hydroxide (6 grs.) in water (145.5 grs.) (Solution D) were prepared. A solution was further obtained by adding Solution D at a rate of 20 grs./min. to a mixture which has been prepared by mixing a mixture of Solution B(27.8 grs.) and Solution C (total amount) with Solution A (118.4 grs.) while stirring and, then, by further stirring the resulting mixture for consecutive 3 hours (Solution E).

On the other hand, 500 grs. of urea particles having an average particle size of 9 mm were placed in a coating chamber and fluidized by controlling the air-flow rate at $5 \times 10^{-2}$ m$^3$/sec. while preheating the particles to 70° C. for 30 minutes. Solution A (39.5 grs.) was diluted with water until the solid content (Sodium silicate) reached to 30% by weight. The diluted solution was fed on the fluidizing columns in the rate of 5 ml/min. and sprayed under a nozzle pressure of 1.25 kg/cm$^2$. At the end of this time period, the condition was further maintained for 10 minutes and then the temperature was lowered to 40° C. Thereafter, the total amount of Solution E was sprayed on the fluidized particles under the same conditions mentioned above. On the resulting coated particles, a white and opaque coating was formed.

The composites of the coated particles were detected as follows.

| | |
|---|---|
| Urea (particle size diameter 8–10 mm) | 500 parts |
| Sodium silicate | 60 |
| Zinc carbonate | 18 |
| Kaoline | 5 |
| Potassium phosphate | 6 |
| Lithium hydroxide | 6 |

EXAMPLE 2

The particles obtained in Example 1 were allowed to stand for one week in the atmosphere of a place where was well ventilatd and then treated by heat. The particles were treated at 40° C. for 1 hour, at 50° C. for 30 minutes and at 60° C. for 30 minutes. Then, when the temperature reached to 90° C. by increasing it gradually at the rate of 0.5° C. per minute, the particles were heated for 4 hours while maintaining the temperature at 90° to 100° C.

It was found that, upon being placed in a water-bath, the treated particles were settled down on the bottom of the bath. The rate of release of the nitrogen contained in the particles were in the following table.

| Time of Stand (days) | 1 | 2 | 3 | 4 | 5 | 6 | 7 |
|---|---|---|---|---|---|---|---|
| Nitrogen Released (%) | 1.8 | 4.6 | 9.1 | 15.5 | 19.0 | 28.9 | 34.3 |

EXAMPLE 3

Urea particles having an average particle size of 1 to 2 mm were coated in the same manner as described in Example 1. During the coating procedure, some of the particles were coagulated, but such coagulation was little consideration because less than 1/20 thereof were only coagulated.

Urea particles having an average of 3 to 5 mm were coated in accordance with the procedure described in Example 1, except that the nozzle pressure was 0.75 kg/cm$^2$. During the procedure, no coagulation was found. The coated particles were treated by heat in the same manner as described in Example 2. After the lapse of 24 hours, the rate of release of the nitrogen contained in the particles was checked as shown in the following table.

| Particle Size (mm) | Nitrogen Released (%) |
|---|---|
| 1-2 | 9.3 |
| 3-5 | 7.6 |

EXAMPLE 4

300 Grs. of the product prepared in Example 2 or 3 were placed in a polyethylene bag and 1 kgr. of a weight was put on the bag. After three month's storage, an experiment was conducted for detecting the rate of release of the nitrogen contained in the particle. As a result, it was found that there was no change in the rate as compared with that prior to the storage.

EXAMPLE 5

A mixture of 263.2 grs. of potassium silicate (solid content 38% by weight; silicon oxide/potassium oxide=2.57 by weight) and 132.6 grs. of water in a flask was heated to 90° C. while refluxing volatile components therefrom with a condenser. To the mixture, 15 grs. of finely divided silica were added and then the resulting mixture was heated for 4 hours while severely stirring to produce a homogenous solution (Solution F).

Different solutions of 5.0 grs. of potassium phosphate and 1.2 grs. of potassium hydroxide in 18.1 grs. of water (Solution G), of 0.84 gr. of zinc chloride in 70.0 grs. of water (Solution H) and, of 8 grs. of talc and 10 grs. of titania in 62 grs. of water (Solution I) were prepared.

To a complete dispersion which was obtained by severely stirring a mixture of 337.3 grs. of Solution F and the total amount of Solution I, the total amount of Solutions G and H were added and stirred for 10 minutes (This final mixture will hereinafter be referred to as "Solution J.").

Except for using Solution J instead of Solution E, the coating procedure of Example 1 was repeated. The resulting coated particles were allowed to expose to the atmosphere for one week and then treated by heat for 2 hours at 40° C. and 30 minutes at 70° C. in a heating chamber. Subsequently, the particles were heated for 15 minutes at 90° to 100° C. in the chamber. Immediately after the particles were taken out from the heating chamber, the temperature was consistently maintained for 4 hours at 90° to 100° C. The composites of the resulting coating to 500 grs. of the coated particles were evaluated as shown below.

| | |
|---|---|
| Sodium silicate | 15 parts |
| Potassium silicate | 47 |
| Potassium phosphate | 2.5 |
| Potassium hydroxide | 0.6 |
| Zinc chloride | 0.4 |
| Talc | 4.0 |
| Titanium oxide (Titania) | 5.0 |

The product thus obtained was found to have released 2.5% of the nitrogen contained therein, after having being soaked in water for 24 hours.

EXAMPLE 6

A mixture of alumina (10 grs.), calcium phosphate (7 grs.), magnesium phosphate (8 grs.), calcium carbonate (3 grs.), aluminium sulfide (1 gr.), zinc silicofluoride (0.8 gr.), potassium silicofluoride (0.4 gr.), bentonite (2 grs.) and water (48.3 grs.) was heated for 2 hours at 80° C., 2 hours at 150° C. and subsequently for 3 hours at 400° C. Thereafter, the sintered product was pulverized into particles of 100 mesh below. Then, 16.1 grs. of the pulverized product were taken and mixed with 4 grs. of zinc oxide and 0.8 gr. of sodium polyphosphate. This mixture was dissolved in water to give a solution containing a solid content of 30% by weight (Solution K). The total amount of Solution K was mixed with 118.4 grs. of Solution A. The mixed solution was diluted with water until the solid content became 20% by weight (Solution L).

Using solution L instead of Solution E, the coating procedure of Example 1 and then the heat-treatment of Example 3 were repeated. The resulting particles were placed in a wire-net bag and soaked in a 50% phosphoric acid solution for 30 minutes. At the end of this time period, the particles were taken out from the phosphoric solution, dried in the air for 3 days and heated to 50° C. for 2 hours.

The composites of the coating thus obtained to 500 grs. of urea and the releasing rate of nitrogen were detected as shown below.

| | |
|---|---|
| Sodium silicate | 60 parts |
| Alumina | 5 |
| Calcium phosphate | 3.5 |
| Magnesium phosphate | 4 |
| Aluminium chloride | 0.5 |
| Calcium carbonate | 1.5 |
| Zinc silicofluoride | 0.4 |
| Potassium silicofluoride | 0.2 |
| Zinc oxide | 4 |
| Sodium polyphosphate | 0.8 |
| Bentonite | 1 |
| Nitrogen released after 24 hours = 3.8% | |

EXAMPLE 7

Solutions of 13.5 grs. of zinc oxide and 0.8 gr. of calcium fluoride, both of which fall within the first additives mentioned above, in 70 grs. of water (Solution M), and of 3 grs. of potassium phosphate, 0.2 gr. of magnesium chloride and 0.4 gr. of iron sulfide, all of which fall within the second additives mentioned above, in 36 grs. of water (Solution N) were prepared. The total amount of Solution M and 3 grs. of kaoline powder (a third additive) were added to 118.4 grs. of Solution A and, to this mixture, the total amount of Solution N was added while sufficiently stirring to produce another Solution O.

Using Solution O instead of Solution E, the coating procedure of Example 1 and the heat-treatment of Example 2 were repeated.

The composite of the resulting coating to 500 grs. of the treated urea particles and the rate of the released nitrogen were detected as shown below.

| | |
|---|---|
| Sodium silicate | 60 parts |
| Zinc oxide | 13.5 |
| Kaoline | 3 |
| Potassium phosphate | 3 |
| Calcium fluoride | 0.8 |
| Magnesium chloride | 0.2 |
| Iron sulfide | 0.4 |
| Nitrogen released after 24 hours = 1.9% | |

In Example 8 through 12, the procedure of Example 7 was repeated, except that different additives were used. The experimental test was also conducted as described in Example 7.

EXAMPLE 8

| Sodium silicate | 60 parts |
|---|---|
| Zinc carbonate | 13.5 |
| Aluminium hydroxide | 4 |
| Calcium hydroxide | 1.2 |
| Talc | 3 |
| Ammonium phosphate | 0.3 |
| Carageenan | 0.2 |
| Nitrogen released after 24 hours = 7.1% | |

EXAMPLE 9

| Sodium silicate | 60 parts |
|---|---|
| Zinc carbonate (Titania) | 13.5 |
| Titanium oxide | 6 |
| Kaoline | 4 |
| Zeolite | 2 |
| Magnesium silicofluoride | 0.8 |
| Aluminium sulfide | 0.2 |
| Nitrogen released after 24 hours = 2.6% | |

EXAMPLE 10

| Sodium silicate | 45 parts |
|---|---|
| Zinc powder | 9 |
| Potassium phosphate | 6 |
| Magnesium hydroxide | 2 |
| Kaoline | 3 |
| Sodium aluminate | 1 |
| Nitrogen released after 24 hours = 1.3% | |

EXAMPLE 11

| Sodium silicate | 60 parts |
|---|---|
| Aluminium phosphate | 12 |
| Magnesium oxide | 6 |
| Silicone oxide (Silica) | 3 |
| Calcium sulfite | 3 |
| Talc | 3 |
| Sodium silicofluoride | 0.4 |
| Zinc sulfide | 0.4 |
| Nitrogen released after 24 hours = 4.5% | |

EXAMPLE 12

| Sodium silicate | 60 parts |
|---|---|
| Iron oxide | 12 |
| Magnesium carbonate | 6 |
| Zinc phosphate | 3 |
| Aluminium fluoride | 0.4 |
| Kaoline | 3 |
| Ammonium carbonate | 0.4 |
| Nitrogen released after 24 hours = 8.9% | |

REFERENCE 2

In a coating machine having fluidizing columns (UNI-GLATT from Ogawahara Seisakushoi, Japan), 500 grs. of composite fertilizer particles (N:P:K=18:18:18 by weight) having an average particle size of 3 to 5 mm were placed. The fertilizer particles were preheated for 30 minutes at 70° C. while maintaining the air-flow rate at $5 \times 10^{-2}$ m$^3$/sec.

After 118.4 grs. of Solution A which was prepared in Reference 1 were diluted with water until the content of sodium silicate became 24% by weight, the diluted solution was sprayed on the fluidizing columns at the flow rate of 7 ml/min. under a nozzle pressure of 1.0 kg/cm$^2$. The temperature in the fluidizing columns was consistently maintained at 73±2° C. through the coating procedure of the fertilizer particles. Upon completing the coating procedure, the fluidized particles were cooled to an ambient temperature and dried for 10 minutes.

During the coating procedure, no coagulation was detected between the particles and smooth and transparent coatings were formed around the particles. No cracks on the surfaces of the coated particles were also found under a microscopical examination at 30 magnification. The coated particles were maintained at 40° C. for 30 minutes. Thereafter, when the temperature reached to 90° C. by gradually increasing it at the rate of 0.5° C. per minute, the particles were treated by heat for 1.5 hours while maintaining the temperature at 95±5° C. Upon completing the heat-treatment, the coated fertilizer particles were placed in a water-bath. As a result, it was found that after the end of 24 hours, 100 percent of the nitrogen contained in the fertilizer particles had been released.

Whereas the present invention has been described with respect to specific embodiments thereof, it should be understood that the invention is not limited thereto, as many modifications thereof may be made. It is, therefore, contemplated to cover by the present application any and all such modifications as fall within the true spirit and scope of the invention.

What is claimed is:

1. A fertilizer product in granular form with sustained action comprising a granular fertilizer material coated with a coating material having 1 to 50% by weight of a silicate or silicic acid ester based on the weight of the fertilizer material to be treated, 0.001 to 1.0 part by weight of a metal or non-aqueous metallic compound, 0.001 to 1.0 part by weight of an aqueous metallic compound, 0.001 to 1.0 part by weight of an inorganic mineral, and an optionally high molecular weight organic compound, wherein all parts are based on the weight of the silicate or silicic acid ester used.

2. The fertilizer product of claim 1 wherein said silicate and/or silicic acid ester is selected from the group consisting of lithium silicate, sodium silicate, potassium silicate and ethyl silicate, said silicate and/or silicic acid ester being used either alone or in combination with one or more of the other.

3. The fertilizer product of claim 1 wherein said metal and/or non-aqueous metallic compound is selected from the group consisting of oxides, hydroxides, fluorides, carbonates and phosphate of magnesium, calcium, iron, zinc and aluminium, zinc, aluminium, calcium sulfate, aluminium phosphate, ferrosilicon, calcium silicide, calcium sulfide, calcium silicofluoride, titanium oxide and silicon oxide, said metal and non-aqueous metallic compound being used either alone or in combination with one or more of the other.

4. The fertilizer product of claim 1 wherein said aqueous metallic compound is selected from the group consisting of phosphates, carbonates, fluorides, sulfides, sulfates, hydroxides, borates and silicofluorides of ammonium, sodium and potassium, and chlorides, sulfides, sulfates and silicofluorides of magnesium, zinc, aluminium and iron, said aqueous metallic compound being used either alone or in combination with one or more of the other.

5. The fertilizer product of claim 1 wherein said inorganic mineral is selected from the group consisting of kaoline, nitre, boiling stone, talc, diatomaceous earth, alumina, feldspar, alunite, bentonite and pearlite, said inorganic mineral being used either alone or in combination with one or more of the other.

6. The fertilizer product of claim 1 wherein said coating material further includes a small amount of a high molecular weight organic compound selected from the group consisting of gelatine, carageenan and cellulose derivatives.

7. A process for preparing a fertilizer product in granular form with sustained action which comprises coating a granular fertilizer material with a coating material comprising 1 to 50% by weight of a silicate or silicic acid ester based on the weight of the fertilizer material to be treated, 0.001 to 1.0 part by weight of a metal or non-aqueous metallic compound, 0.001 to 1.0 part by weight of an aqueous metallic compound, 0.001 to 1.0 part by weight of an inorganic mineral, and an optionally high molecular weight organic compound, wherein all parts described above are based on the weight of the silicate or silicic acid ester used; and heat treating the coated material at a temperature ranging from about 10° to 250° C.

8. The process of claim 7 wherein said silicate and/or silicic acid ester is selected from the group consisting of lithium silicate, sodium silicate, potassium silicate or ethyl silicate, said silicate and/or silicic acid ester being used either alone or in combination with one or more of the other.

9. The process of claim 7 wherein said metal and/or non-aqueous metallic compound is selected from the group consisting of oxides, hydroxides, fluorides, carbonates and phosphate of magnesium, calcium, iron, zinc and aluminium, calcium sulfate, aluminium phosphate, ferrosilicon, calcium silicide, calcium sulfide, calcium silicofluoride, titanium oxide and silicon oxide, said metal and non-aqueous metallic compound being used either alone or in combination with one or more of the other.

10. The process of claim 7 wherein said aqueous metallic compound is selected from the group consisting of phosphates, carbonates, fluorides, sulfides, sulfates, hydroxides, borates and silicofluorides of ammonium, sodium and potassium, and chlorides, sulfides, sulfates and silicofluorides of magnesium, zinc, aluminium and iron, said aqueous metallic compound being used either alone or in combination with one or more of the other.

11. The process of claim 7 wherein said inorganic mineral is selected from th group consisting of kaoline, talc, diatomaceous earth, alumina, feldspar, alunite, bentonite, and pearlite, said inorganic mineral being use either alone or in combination with one or more of the other.

12. The process of claim 7 wherein said coating material further includes a small amount of a high molecular weight inorganic compound selected from the group consisting of gelatine, carageenan and cellulose derivatives.

13. The process of claim 7 wherein the size of the granular fertilizer ranges from about 0.03 to about 2 mm in diameter.

14. The process of claim 13 wherein said coating is accomplished by feeding the coating material at a rate of 2 to 20 ml/min to about 500 g of the fertilizer material.

* * * * *